United States Patent [19]
Akashi

[11] Patent Number: 4,838,562
[45] Date of Patent: Jun. 13, 1989

[54] DRAWING-IN CLAMPING DEVICE FOR CHUCK OF LATHE OR THE LIKE

[75] Inventor: Yuji Akashi, Gifu, Japan

[73] Assignee: Yugen Kaisha Akashi Tekkosho, Gifu, Japan

[21] Appl. No.: 164,016

[22] Filed: Mar. 4, 1988

[30] Foreign Application Priority Data

Mar. 13, 1987 [JP] Japan .................. 62-58490

[51] Int. Cl.4 .......................... B23B 5/23; B23B 5/34
[52] U.S. Cl. .................................. 279/106; 279/123
[58] Field of Search ................ 279/106, 123, 110

[56] References Cited

U.S. PATENT DOCUMENTS

| | | | |
|---|---|---|---|
| 2,025,086 | 12/1934 | Black | 269/131 |
| 2,691,531 | 10/1954 | Grobey | 279/106 |
| 3,365,206 | 1/1968 | Hohwart et al. | 279/106 X |
| 3,952,384 | 4/1976 | Goldry et al. | 279/106 |
| 4,353,561 | 10/1982 | Peterson | 279/106 X |
| 4,431,202 | 2/1984 | Swenson | 279/106 |

Primary Examiner—Eugene R. LaRoche
Assistant Examiner—Nathan W. McCutcheon
Attorney, Agent, or Firm—Scrivener and Clarke

[57] ABSTRACT

In chucking, a workpiece is clamped while drawn to the chuck body for positive contact of the workpiece to stoppers, whereby a degree of machining accuracy is remarkably improved.

6 Claims, 13 Drawing Sheets

DRAWING-IN CLAMPING DEVICE FOR CHUCK OF LATHE OR THE LIKE

BACKGROUND OF THE INVENTION

The present invention relates to a clamping device for clamping a workpiece to a chuck of a lathe, a grinding machine (for cylindrical or internal grinding), a machining center or the like, and more particularly relates to a drawing-in clamp device of the kind mentioned which can considerably improve a degree of machining accuracy.

Figure 1:
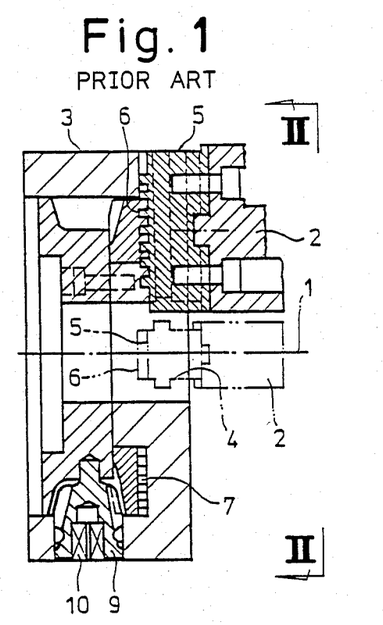
FIG. 1 is a sectional side view of a conventional scroll chuck.
Figure 2:
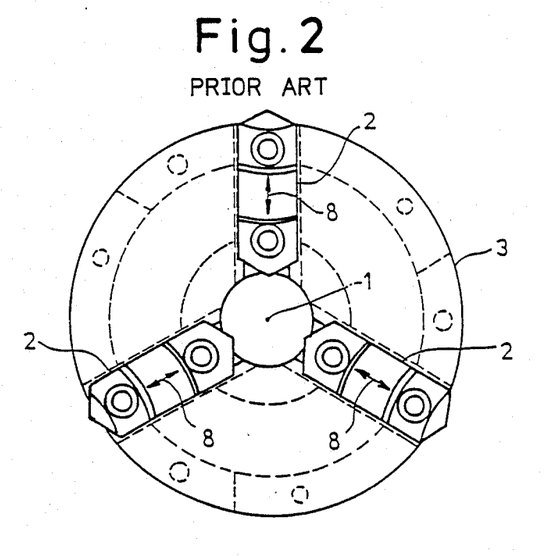
FIG. 2 is a view looking in the direction indicated by arrows II in FIG. 1.

A conventional clamping device for clamping a workpiece to a chuck of a lathe or the like as shown in FIGS. 1 and 2 comprises a plurality of (hard or soft) clamp jaws 2 symmetrically disposed about the center line 1 of a scroll chuck and equiangularly spaced apart from each other. Master jaws 5 support the respective jaws 2 and are adapted to slide in T-section channels 4 in a chuck body 3. In clamping a workpiece, racks 6 on the rear surfaces of the master jaws 5 are driven by a spiral scroll 7 incorporated in the chuck body 3 to radially move all the jaws 2 in unison as indicated by double-pointed arrows 8. In FIG. 1, reference numeral 9 represents a bevel gear for acutating the scroll 7 to rotate about the chuck center line 1; and 10, a recess into which a handle rod (not shown) is pushed.

Figure 3:
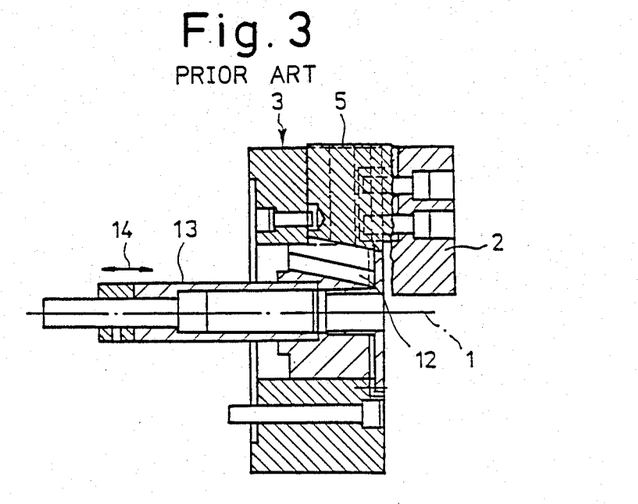
FIG. 3 is a sectional side view of a conventional hydraulic or pneumatic chuck.

In a conventional hydrualic or pneumatic chuck as shown in FIG. 3, wedge-like members 12 are disposed around the chuck center line 1 and adjacent to the master jaws 5 having the jaws 2. A rod 13 is driven by a hydraulic or pneumatic cylinder (not shown) in the direction indicated by a double-pointed arrow 14 to drive all the jaws 2 in unison.

Figure 4:
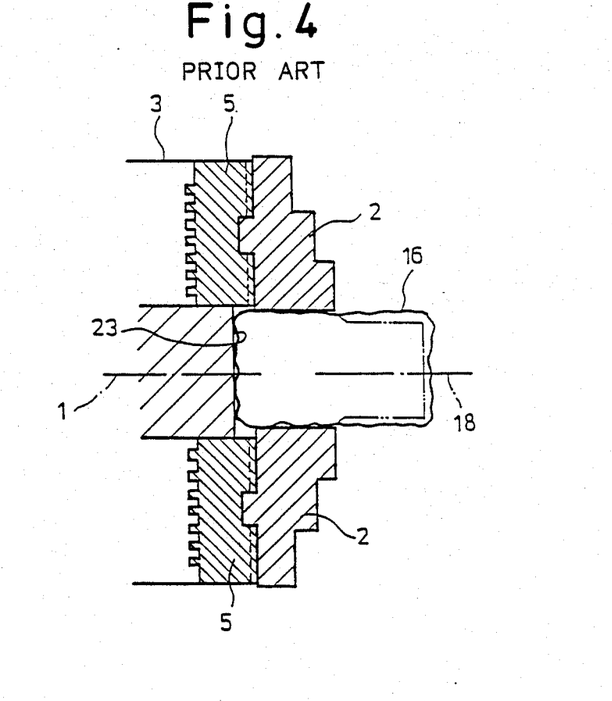
FIGS. 4 and 5 are views used to explain steps of lathe machining.
Figure 5:
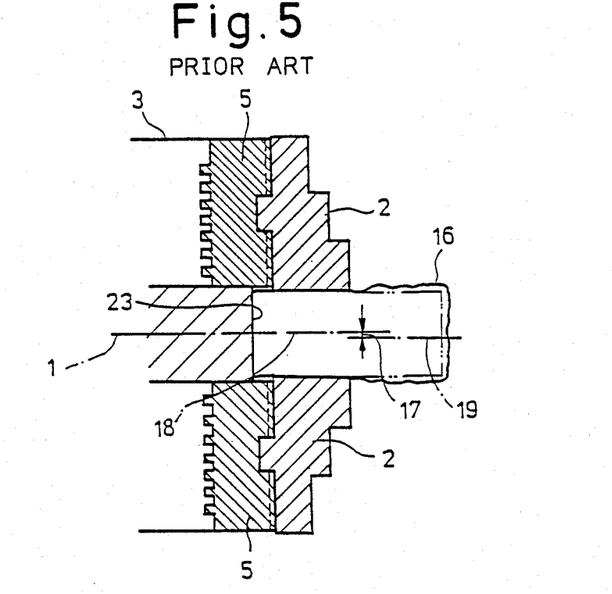

Prior to lathe machining using any of the above-mentioned chucks, a cylindrical dummy or chuck piece (not shown) having a true roundness is clamped by the leading ends of the master jaws 5 and the leading ends of the jaws 2 are machined to be located along a circle so as to prevent misalignment of a workpiece as described in detail hereinafter and to facilitate a jaw centering operation in lot production. As is well known in the art, lathe machining is carried out such that one end of a workpiece 16 is clamped by the chuck and the cylindrical outer surface and end face of the workpiece 16 are machined as indicated by imaginary lines in FIG. 4. Thereafter, the workpiece is once removed from the chuck and the machined end of the workpiece is clamped by the chuck so as to machine the remaining portion as indicated by the imaginary lines in FIG. 5. Use of the dummy as described above contributes to substantial alignment of the center of the jaws 2 with the chuck center line 1 so that centering misalignment or deviation 17 between the centers 18 and 19 of the jaws 2 caused between the first and second chucking steps can be suppressed.

Figure 6:
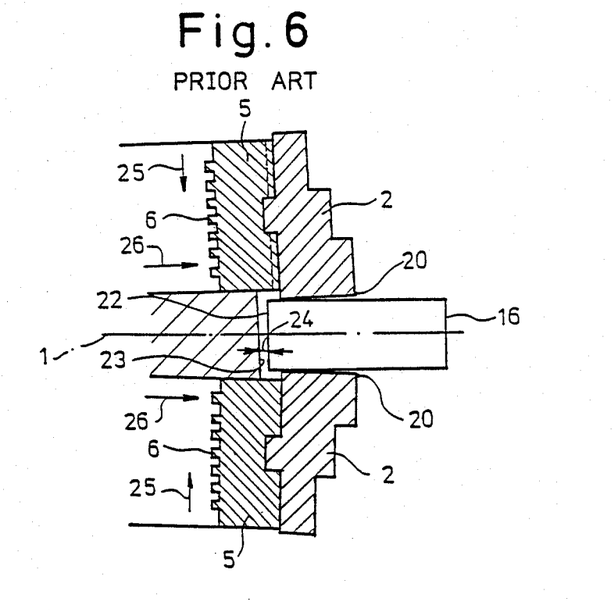
FIG. 6 is a view used to explain adverse situation in conventional clamping.

However, even when the leading ends of the jaws 2 are machined for alignment as described above, the centering misalignment of each machined product is considerably greater (on the order of 3/100–5/100 mm) than expected and there arises a problem that a satisfactory degree of squareness accuracy cannot be attained at end faces of the product. The inventor made extensive studies and experiments to find out when the workpiece 16 is clamped, a phenomenon that edges 20 of the jaws 2 remote from the chuck body are moved away from the outer surface of the workpiece 16 as well as a phenomenon that a gap 24 is left between an end face 22 of the workpiece 16 and a front face 23 of the chuck body may be observed as shown in FIG. 6 even though the workpiece is in contact with the front surface 23 of the chuck body prior to the clamping steps. A possible explanation for these phenomena is that when the scroll 7 presses strongly the racks 6 on the master jaws 5 in the directions indicated by arrows 25, each rack 6 adjacent to the chuck center line 1 is displaced in the direction indicated by arrows 26 so that the whole jaws 2 are forced to tilt backwardly. As a result, accuracy of each machined product (centering alignment, parallelism, flatness and squareness) is degraded and surface condition of a machined product is also degraded by chatter vibrations. The same phenomena are also observed in the conventional hydrualic or pneumatic chucks.

In order to solve the above-described problems, there has been devised and demonstrated a drawing-in chuck which is adapted to draw and clamp a workpiece. It, however, has a problem that a clamping diameter is limited only to one size and even slight change of clamping diameter causes the clamping force and drawing-in conditions to vary over a wide range so that it may not be satisfactorily used in practice. This means that workpieces with slightly different diameters require different drawing-in chucks.

In view of the above, a primary object of the present invention is to provide a clamping device capable of drawing and uniformly clamping a workpiece along its jaw length despite of variation in diameter of the workpiece and without a gap between the end face of the clamped workpiece and front surface of a chuck.

The above and other objects, effects, features and advantages of the present invention will become more apparent from the following description of some preferred embodiments thereof taken in conjunction with the accompanying drawings.

BRIEF DESCRIPTION OF THE DRAWINGS

The same reference numerals are used to designate similar parts throughout the figures.

DETAILED DESCRIPTION OF THE PREFERRED EMBODIMENTS

Referring to FIGS. 7-12, a first embodiment of the present invention will be described which comprises a plurality of (three in the drawings) pendulums 32. Each pendulum 32 has a clamp jaw 31 which is not hardened or quenched and is machinable and which extends radially inwardly from an innermost end of the pendulum 32 towards the center line 1 of a chuck. A holder 35 holds each pendulum 32 with a pin 33 such that the pendulum 32 is swingable in a plane containing the chuck center line 1. A plurality of (three in the drawings) stoppers 38 are mounted on the chuck body 3 adjacent to the chuck center line 1 and interposed between the adjacent holders 35. Each stopper 38 protrudes from the front face 23 of the chuck body to define an abutment 39 at its leading end. The stopper 38 as shown is situated in the most withdrawn position and may be horizontally position-adjusted in accordance with clamp margin by the jaw 31 depending upon shape of the workpiece 16.

Figure 7:
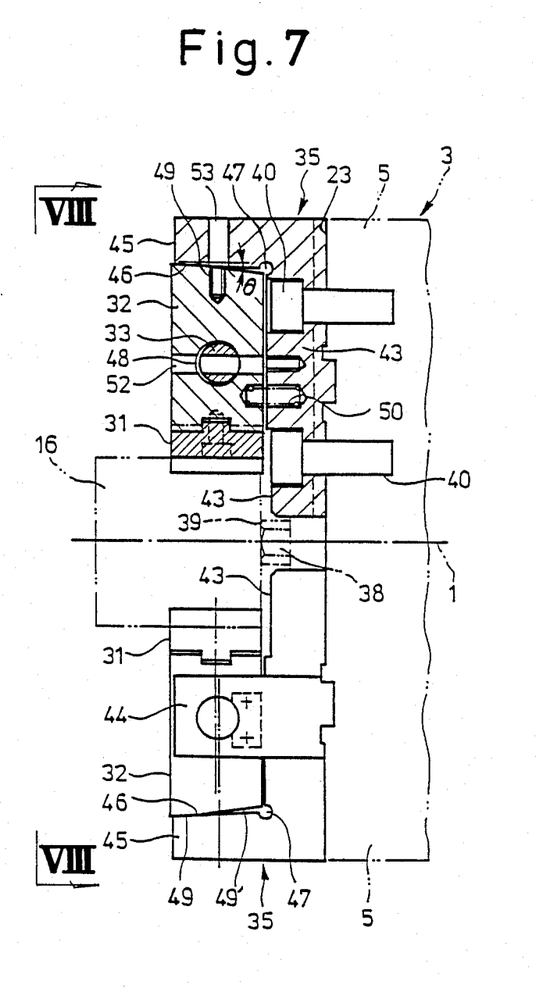
FIG. 7 shows a clamping device according to a first embodiment of the present invention, the upper half thereof being a view looking in the direction indicated by arrow A in FIG. 8 while the lower half is a view looking in the direction indicated by arrow B in FIG. 8.
Figure 8:
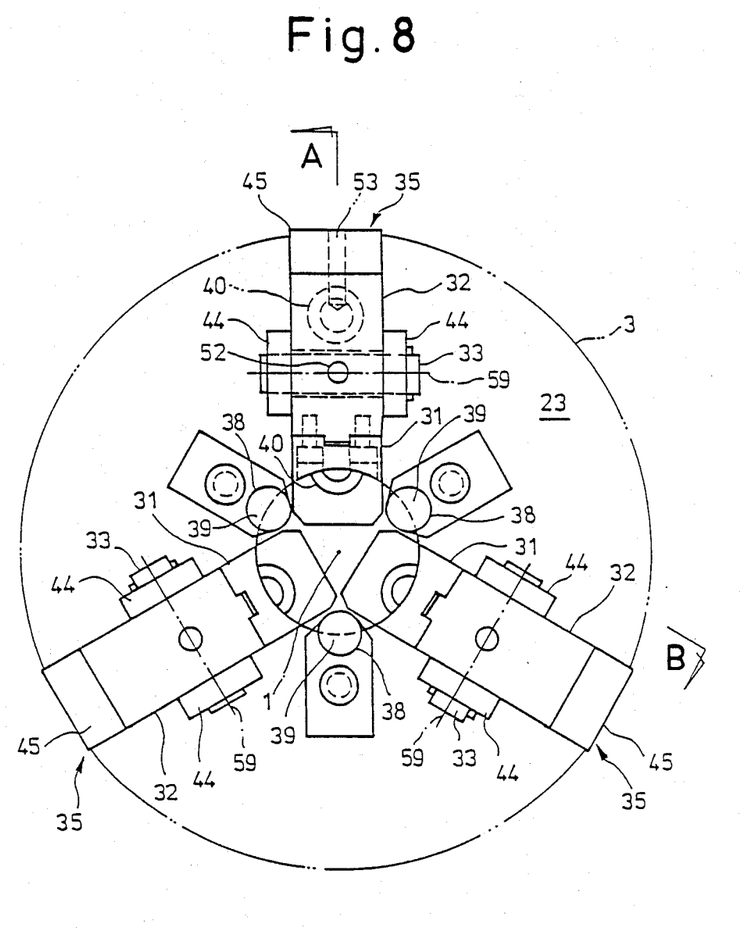
FIG. 8 is a view looking in the direction indicated by arrows VIII in FIG. 7.

Each holder 35 comprises a base 43 which is in the form of plate and integrally joined to the master jaw 5 with push bolts 40, brackets 44 which are joined on opposite sides of the base 43 to support the pins 33 in parallel with the base 43 and a projection 45 extending from the base 43 in the direction away from the chuck body 3. The projection 45 is formed with a flat surface (push surface) 46 which is inclined away form the chuck center line 1 in the direction away from the chuck body 3 (angle $\theta$ of inclination of the inclined surface 46 is about three degrees) and which is hardened and polished. A recess (or relief) 47 is formed at an inner corner of the holder 35 at which the base 43 and the projection 45 intersect each other.

Each pendulum 32 is substantially in the form of rectangular parallelepiped and is formed with an opening 48 which has a diameter slightly greater than that of the pin 33 and which is located substantially in the middle of the rectangular parrallelepiped to slidably receive the pin 33. Furthermore the end of each pendulum 32 remote from the chuck center line 1 provides a contact end surface 49 which is adapted to closely abut on the inclined surface 46 of the projection 45 when the pendulum 32 swings into a position where an arcuate end surface defined by machining the leading end of the jaw 31 is substantially in parallel with the chuck center line 1. The contact end surface 49 is cut out over a range from its side end near the chuck body 3 to at least a line L, which extends perpendicular to the chuck center line 1 from a point on a wall surface defining the opening 48 most adjacent to the chuck body 3 (see FIG. 9), to thereby provide a non-contact portion 49' which is always out of contact with the inclined surface 46.

Figure 9:
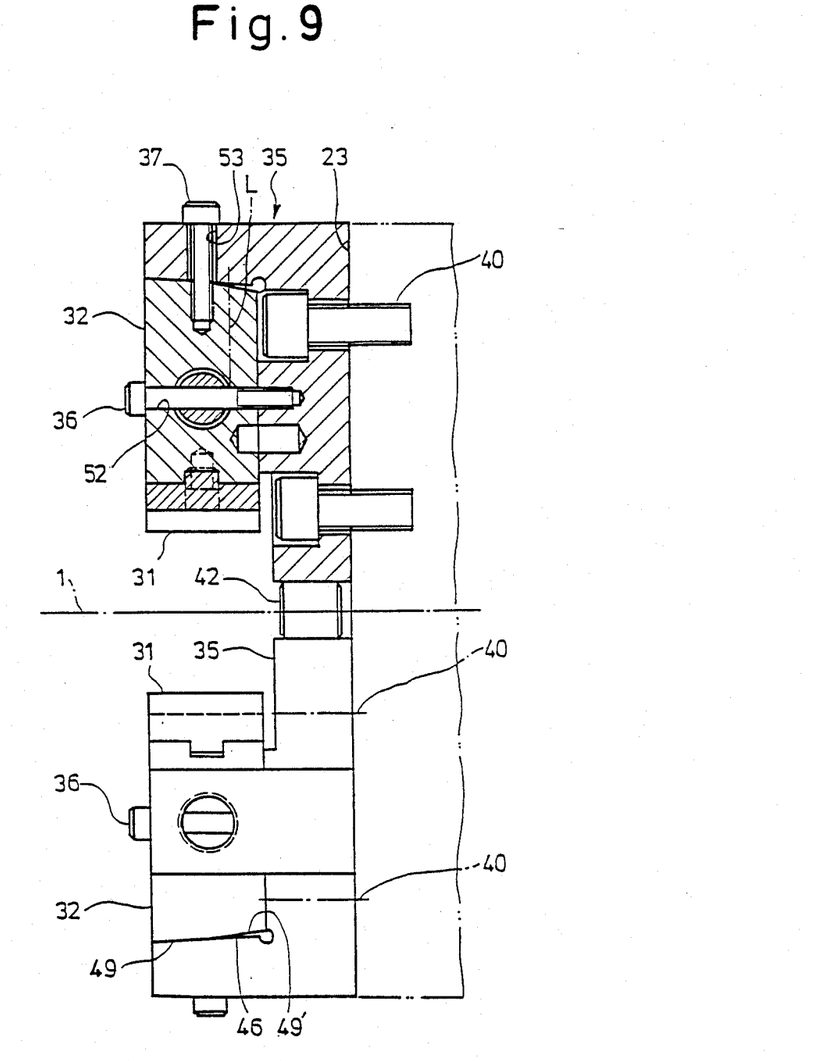
FIG. 9 is a view used to explain assembling of the clamping devivce according to the first embodiment.

A spring 50 is loaded into a recess on the pendulum 32 which is more closely located to the chuck center line 1 than the opening 48 and into a corresponding recess on the holder base 43 in aligned relationship with said first recess, and serves to push out the pendulum 32 such that the jaw 31 is always urged in the direction away from the chuck. Referring especially to FIG. 9, reference numerals 36, 37, 52 and 53 are bolts and bolt holes, respectively, for securely joining the pendulum 32 to the holder 35 when the jaw is machined.

Next assembling, handling and mode of operation of the first embodiment with the above-mentioned construction will be described.

In assembling, first the stoppers 38 are attached to the front surface 23 of the chuck body 3 and then machined such that the leading ends of all the stoppers 38 are positioned in the same vertical plane, that is, in a plane perpendicular to the chuck center line 1. Next, as shown in FIG. 9, each pendulum 32 is securely joined with the bolts 36 and 37 such that the pendulum 32 closely contacts the inner wall surfaces of the holder 35 and its extension 45. Then, a cylindrical dummy 42 which has been machined to have a true circular section is clamped in coaxial relationship with the chuck center line 1. Thereafter, the leading ends of the jaws 31 are machined such that they are along a circle having a diameter substantially equal to that of a workpiece to be machined. By this machining step, arcuate end faces (surfaces of first degree) at the leading ends of the jaws 31 become parallel with the chuck center line 1 perpendicular to the abutments 39 of the stoppers 38.

Figure 10:
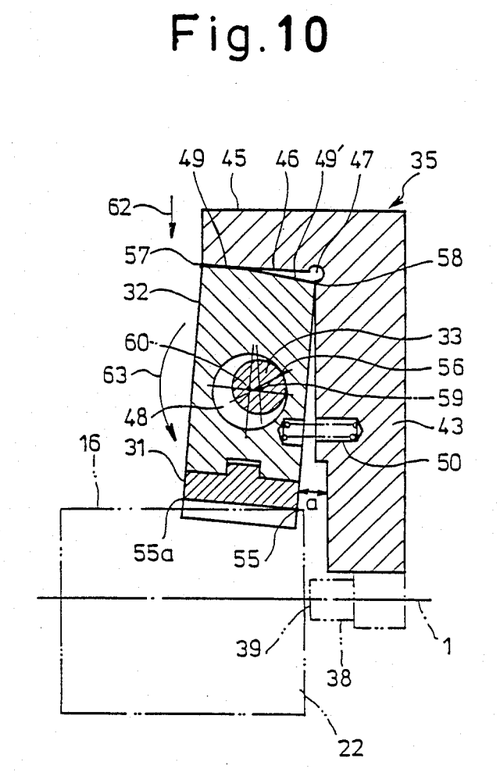
FIGS. 10–12 are views used to explain mode of operation of the clamping device according to the first embodiment.

Next the bolts 36 and 37 are removed and the spring 50 is loaded into the opposed recesses of the pendulum 32 and holder 35. Thereafter the pin 33 is inserted into the opening 48 of each pendulum 32 and is securely joined at its opposite ends to the holder 35 through the brackets 44. Because of the loaded spring 50 being more closely positioned to the chuck center line 1 than the opening 48, the pendulum 32 swings about a point of contact 56 between the pin 33 and the wall surface of the opening 48 as shown in FIG. 10. As a result, a portion of the pendulum 32 closer to the chuck center line 1 protrudes forwardly under the force of the spring 50 while the end of the pendulum 32 remote from the chuck center line 1 contacts the holder 35 at points 57 and 58. Referring especially to FIG. 10, reference numeral 59 represents an axis of the pin 33; and 60, an axis of the opening 48.

After the completion of assembling, a workpiece 16 to be held by the chuck is placed between the jaws 31 such that the workpiece 16 is spaced apart at its end face 22 from the abutment 39 of the stopper 38 by one to two millimeters. Then, the master jaws 5 are activated to tighten all the holders 35 in unison so as to clamp the workpiece 16. Next referring to FIGS. 10-12, the mode of operation of each pendulum 32 from begining to end of the clamping step will be described.

FIG. 10 shows initiation of the clamping step. Because of the portion of each pendulum 32 closer to the chuck center line 1 being urged forwardly as described above and being spaced apart by a wider distance a from the holder base 43, a portion 55 of the leading end of each jaws 31 near the holder 35 contacts the workpiece 16 while a portion 55a remote from the holder 35 is apart from the workpiece 16.

Figure 11:
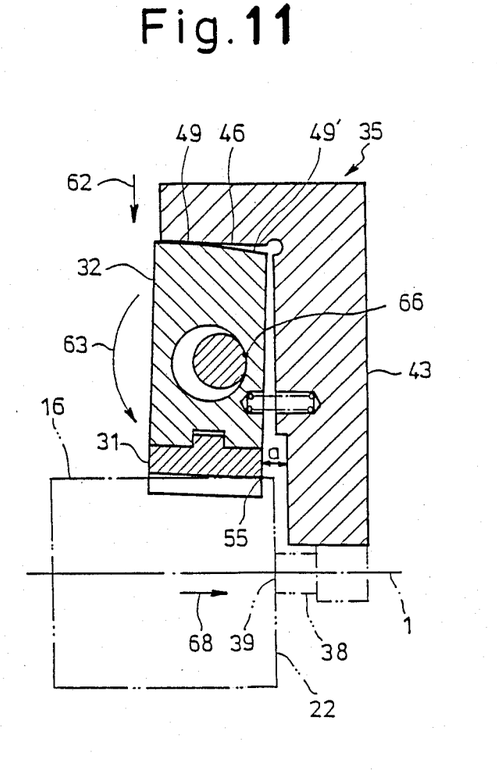
Figure 12:
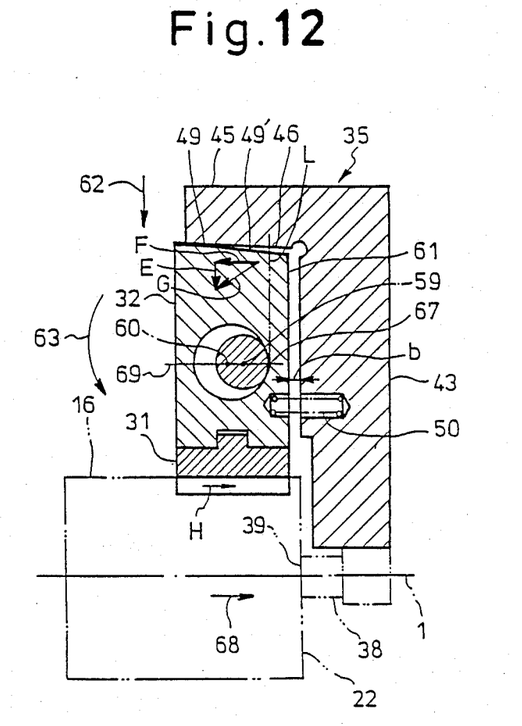

Then, the holder 35 is further tightened in the direction indicated by arrow 62. As a result, the pendulum 32 swings in the direction indicated by arrow 63 about the point of contact 56 between the pin 33 and the wall surface of the opening 48 against the force of the spring 50 so that the point of contact between the pin 33 and the wall surface of the opening 48 is shifted to a point 66 as shown in FIG. 11. Thereafter the holder 35 is further tightened for further swinging motion of the pendulum 32. As a result, as shown in FIG. 12, the jaw 31 contacts the workpiece 16 and most of the end surface 49 of the pendulum 32 contacts the inclined surface 46 of the holder projection 45, a rear surface 61 of the pendulum 32 adjacent to the holder 35 being in opposed relationship with the holder base 43 at a uniform distance b which is equal to or smaller than the difference in diameter between the pin 33 and the opening 48. In this case, the pin 33 contacts the pendulum 32 at point 67 which is the closest point to the rear surface 61 on the wall surface of the opening 48, the point 67, the axis 59 of the pin 33 and the axis of the opening 48 being located along a line 69 which is substantially in parallel with the chuck center line 1. Thus, the swinging motion of the pendulums 32 described above causes the workpiece 16 to be drawn in the direction indicated by arrow 68 to the chuck body to contact the stopper 38.

Then, the holder 35 is further tightened so that the inclined surface 46 pushes the contact end surface 49 which is located ahead of the line L extending from the point of contact 67 between the pin 33 and the wall surface of the opening 48. Therefore, force acts on the pendulum 32 to swing it in the direction indicated by arrow 63 and the contact end surface 49 of the pendulum 32 is facilitated to slide forwardly because of the inclined surface 46 so that the swinging motion of the pendulum 32 is further facilitated. Providing that the tightening force is represented by E and the pushing force, by F, resultant force G of these forces E and F has a vertical component to clamp the workpiece while its horizontal component provides force H which urges the workpiece 16 to the stopper 38 about the point of contact 67 between the pin 33 and the wall surface of the opening 48 against the force of the spring 50. As a result, the jaw 31 completely contacts the workpiece 16 over the whole length thereof to securely clamp the latter while the workpiece 16 is forcibly pressed at its end face 22 to the stopper 38. Thus, the workpiece 16 can be securely clamped by the three jaws 31 and stoppers 38.

In assembling, the leading ends of the jaws 31 are machined in the form of arc in parallel with the chuck center line 1 by utilizing the dummy 42 and the leading ends of the stoppers 38 are machined to be in a vertical plane perpendicular to the chuck center line 1 so that the machining accuracy of the workpiece is improved and that the misalignment 17 between the centers 17 and 19 (See FIG. 5) and the degree of out-of-squareness at the end face 22 of the workpiece 16 caused by the machining of the opposite ends of the workpiece by a lathe can be reduced to a minimum.

So far the workpiece 16 has been described as being placed with its end face 22 being spaced apart from the stopper abutment 39 by one to two millimeters at the initiation of the clamping step; but it is to be understood that the workpiece 16 may be placed with no gap being left between the workpiece 16 and the stopper abutment 39 from the begining. In the latter case, already at the initial stage shown in FIG. 10, force acts on the workpiece 16 to forcibly press the same to the stopper abutment 39 so that the workpiece 16 is always in contact at its end face 22 with the stopper 38. Then, the surface 46 of the holder 35 and the contact end surface 49 of the pendulum 32 remote from the chuck center line 1 are not always needed to be inclined and may be machined perpendicular to the front surface 23 of the chuck body.

Figure 18:
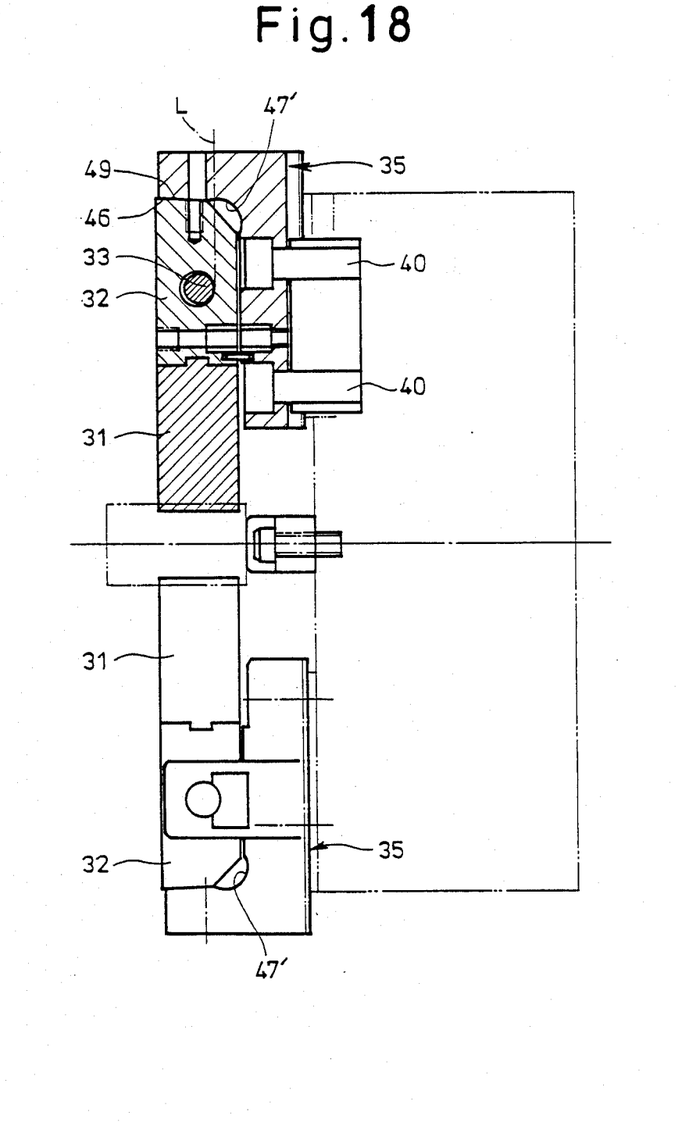
FIG. 18 is a view used to explain an example of a non-contact portion in the present invention.

The non-contact portion 49' may be formed at the inclined surface 46 or both at the contact end face 49 and the inclined surface 46. Furthermore, size and profile of the non-contact portion may be variously selected. For instance, the recess 47 at the inner corner of the holder 35 may be enlarged to provide a cutout 47' as shown in FIG. 18, said cutout extending beyond the line L and serving as the non-contact portion.

So far the pin 33 has been described as extending through the opening 48 and securely joined to the holder 35; but it is to be understood that the pins 33 may be opposite projections on the pendulum 32 to extend through openings on the brackets 44 of the holder 35. Instead of the circular cross-sectional configuration of the pin 33, only a portion of the pin 33 which contacts the wall surface of the opening 48 may be defined in the form of arc while the remaining portion may be in the form of any shape such as polygon.

Various springs such as leaf springs or torsion springs may be used in lieu of the coiled springs 50.

Figure 13:
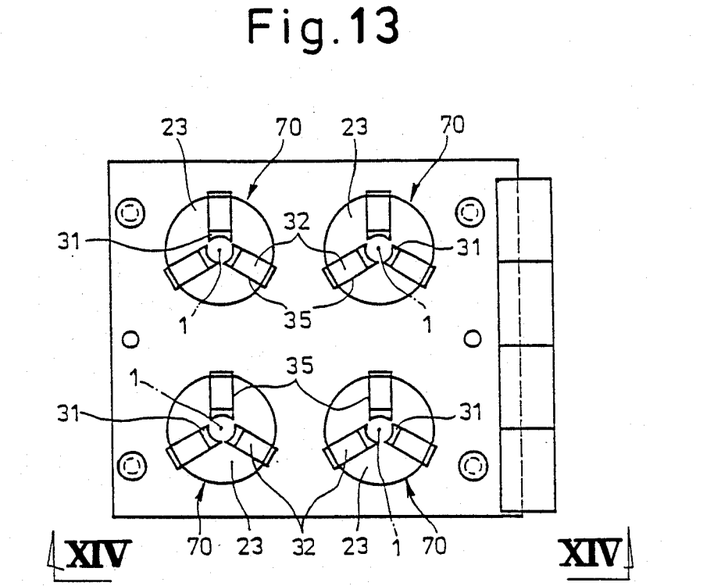
FIG. 13 shows a clamping device according to a second embodiment of the present invention and is a top view of a four-chuck assembly adapted for use in a compound machine and incorporating the clamping devices.
Figure 14:
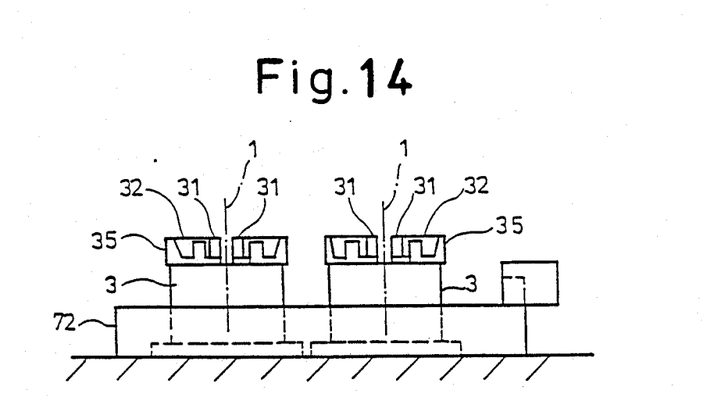
FIG. 14 is a view looking in the direction indicated by arrows XIV in FIG. 13.

FIGS. 13 and 14 show a second preferred embodiment of the present invention which is applied to a four-chuck assembly comprising four hydrualic chucks 70. Each of the chucks 70 is tightened by a hydraulic cylinder (not shown) accomodated in a base 72.

Figure 15:
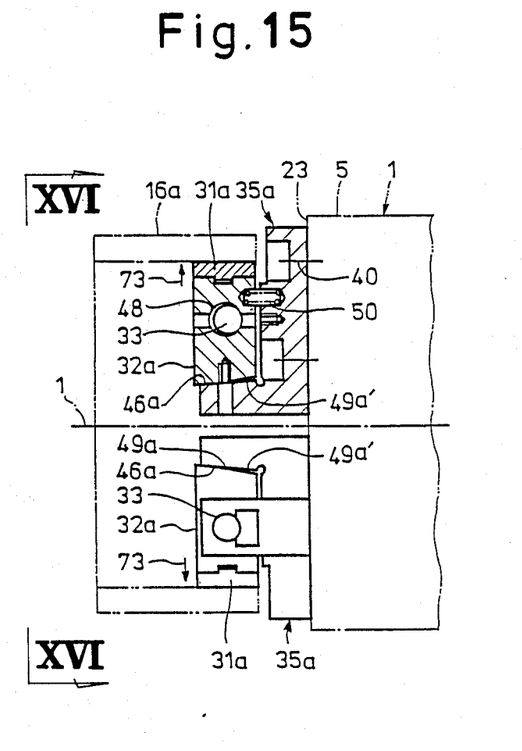
FIG. 15 shows a clamping device according to a third embodiment of the present invention, the upper half thereof being a view looking in the direction indicated by arrow C in FIG. 16 while the lower half is a view looking in the direction indicated by arrow D in FIG. 16.
Figure 16:
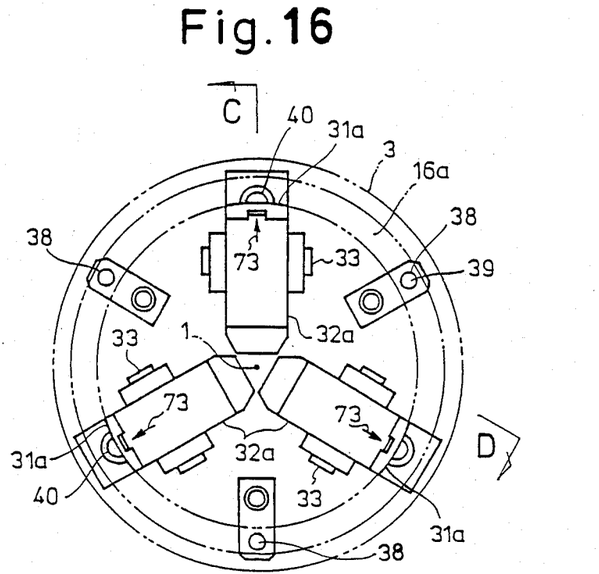
FIG. 16 is a view looking in the direction indicated by arrows XVI in FIG. 15.
Figure 17:
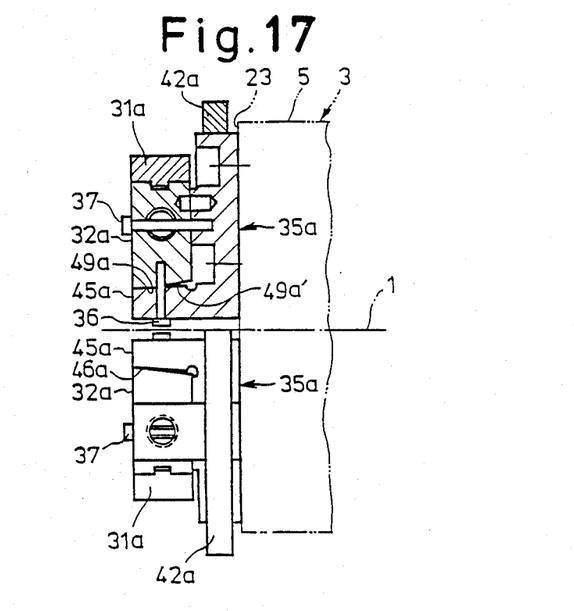
FIG. 17 is a view used to explain assembling of the clamping device according to the third embodiment.

Referring next to FIGS. 15-17, a third preferred embodiment of the present invention will be described. This embodiment is adapted to clamp a cylindrical hollow workpiece 16a. Each jaw 31a is attached to an end of the pendulum 32a remote from the chuck center line 1 and a contact end face 49a is provided by an end of the pendulum 32a adjacent to the chuck center line 1 and is adapted to contact an inclined surface 46a of a projection 45a extending adjacent to the chuck center line 1 from a holder 35a. A spring 50 is loaded at a position farther to the chuck center line 1 than the opening 48. Each stopper 38 is equiangularly disposed along a circle adjacent to the outer periphery of the front surface 23 of the chuck body. A dummy 42a which is in the form of ring and has an inner periphery with a true circular cross-sectional configuration is fitted over the holders 35a when the jaws 31 are to be machined. Each jaw 31a has a leading end in the form of radially outwardly convex arc and braces outwardly to securely hold the workpiece 16a when the latter is to be clamped as indicated by arrows 73 in FIG. 15.

It is to be understood that the present invention is not limited to the above-described embodiments and that various modifications may be made within the true spirit and scope of the present invention.

Excellent effects of the present invention may be summarized as follows:

(i) Under the condition that each pendulum is swingably supported by the holder and that the jaw-attached end of the pendulum is urged away from the front surface of the chuck body under the force of the spring, the pendulum is tightened in the radial direction of the chuck by the holder extension, so that the pendulum swing to draw the workpiece until the latter contacts the stoppers and consequently the leading ends of the jaws uniformly clamp the workpiece over the whole length thereof. During the clamping of the workpiece, force acts on the pendulums to rotate them, whereby the workpiece is forcibly pressed to the stoppers. As a consequence, the workpiece is securely held in position by the jaws and stoppers.

(ii) Since the workpiece is securely and rigidly clamped, the degree of machining accuracy is improved so that the centering misalignment can be considerably reduced (on the order of 1/100 mm or less) and the end faces of the workpiece can be machined to have squareness of substantially at 90°.

What is claimed is:

1. A drawing-in clamping device for a chuck of a lathe or the like comprising a plurality of pendulums each having a first end carrying a machinable clamp jaw detachably attached thereto and a second end providing a contact end surface, master jaws on a chuck body adapted to be driven in unison in a radial direction of the chuck, holders each attached to a front surface of the corresponding master jaw, each holder including an extension having a push surface engagable with said contact end surface of the corresponding pendulum substantially in a radial direction of the chuck, said push surface of each of said holders being inclined away from a chuck center line in a direction away from the chuck body, said contact end surface of each of said pendulums also being inclined substantially correspondingly to a push surface of the respective holders, each of said pendulums being formed with an opening, a pin loosely fitted through each of said openings such that said pin does not contact the wall of said opening when the surface of said pendulum adjacent to the holder is closely contacted to said front surface of the holder and said contact end surface of the pendulum is closely contacted to said push surface of the holder, said pin being mounted to its respective holder substantially in parallel with the front surface of the chuck body, springs each loaded between the corresponding holder and pendulum for normally pushing forwardly the jaw-attached end of the pendulum, stoppers attached to the front surface of the chuck body for receiving an end of a workpiece, the push surface of said extension closely contacting the contact end surface of the corresponding pendulum when said pendulum is swung into a position where a shaped end surface of a corresponding clamp jaw is substantially parallel with the chuck center line, and a non-contact portion defined between said contact end surface and the corresponding push surface and extending from a position closest to the chuck body to at least a position intersected by a line extending perpendicular to said chuck center line from that point of contact between the pin and a wall surface of the opening closest to said chuck body.

2. The device according to claim 1 wherein the push surface of said holder projection is inclined to allow the contact end surface of the corresponding pendulum to slide forwardly when the push surface pushes the contact end surface.

3. The device according to claim 1 wherein said non-contact portion is defined as an inclined surface.

4. The device according to claim 1 wherein said non-contact portion is defined in the form of a cutout.

5. The drawing-in clamping device of claim 1, wherein said pendulums are constructed and arranged to be initially securely joined to said holders by bolts such that the holder-side surfaces of said pendulums closely contact the front surfaces of said holder, and said contact end surfaces of said pendulums being engaged with said push surfaces to enable the machining of said clamp jaws to a shape complementary to the shape of a workpiece to be clamped by said clamped jaws.

6. The clamping device of claim 1 wherein each of said pins has point contact with the wall of said opening when a respective pendulum is swingly supported by said pin, said point contact being shiftable in the direction of said front surface as said pendulum is swung there towards.

* * * * *